(12) United States Patent
Yang

(10) Patent No.: US 10,493,745 B2
(45) Date of Patent: Dec. 3, 2019

(54) METHOD FOR MEASURING HEIGHT DIFFERENCE BETWEEN NOZZLE HEADS AND 3D PRINTING APPARATUS USING THE METHOD

(71) Applicants: XYZprinting, Inc., New Taipei (TW); Kinpo Electronics, Inc., New Taipei (TW)

(72) Inventor: Yu-Jie Yang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 224 days.

(21) Appl. No.: 15/461,493

(22) Filed: Mar. 17, 2017

(65) Prior Publication Data

US 2018/0186094 A1    Jul. 5, 2018

(30) Foreign Application Priority Data

Jan. 5, 2017  (TW) .............................. 106100349 A

(51) Int. Cl.
*B33Y 50/02* (2015.01)
*B33Y 10/00* (2015.01)
*B33Y 30/00* (2015.01)

(52) U.S. Cl.
CPC ............... *B33Y 50/02* (2014.12); *B33Y 10/00* (2014.12); *B33Y 30/00* (2014.12); *B29K 2995/0021* (2013.01)

(58) Field of Classification Search
CPC .................................................... B29C 67/088
See application file for complete search history.

(56) References Cited

U.S. PATENT DOCUMENTS 6,646,728 B1    11/2003  Tang et al.
10,155,346 B1 *  12/2018  Gorgi .................. B29C 67/0088
(Continued)

FOREIGN PATENT DOCUMENTS

CN    203381196    1/2014
CN    103660300    3/2014
(Continued)

OTHER PUBLICATIONS

"Search Report of Europe Counterpart Application", dated Mar. 7, 2018, p. 1-p. 8.
(Continued)

*Primary Examiner* — Joseph A Miller, Jr.
(74) *Attorney, Agent, or Firm* — JCIPRNET

(57) ABSTRACT

The invention provides a method for height difference measurement between the print heads and a 3D printer using the method. The 3D printer includes a printing module, a contact sensor, a movement sensor and a controller. The controller makes a 3D print head and the contact sensor contact to each other vertically for generating a contact signal, and obtains a first height value according to a vertical movement distance between the printing module and the contact sensor. The controller makes a color head and the contact sensor contact to each other vertically for generating the contact signal, and obtains a second height value according to a vertical movement distance between the printing module and the contact sensor. The controller obtains a height difference between the 3D print head and the color head according to the first height value and the second height value.

9 Claims, 5 Drawing Sheets

(56) References Cited

U.S. PATENT DOCUMENTS

| | | | | |
|---|---|---|---|---|
| 2012/0162305 A1* | 6/2012 | Swanson | ............... | F04B 53/22 |
| | | | | 347/20 |
| 2015/0017271 A1* | 1/2015 | Donaldson | ............ | B29C 64/112 |
| | | | | 425/171 |
| 2015/0343704 A1 | 12/2015 | Stahl et al. | | |
| 2016/0257068 A1* | 9/2016 | Albert | .................... | B29C 47/92 |
| 2017/0057171 A1* | 3/2017 | Chang | ................ | B29C 67/0088 |

FOREIGN PATENT DOCUMENTS

| | | |
|---|---|---|
| CN | 204020013 | 12/2014 |
| CN | 105216324 | 1/2016 |
| EP | 3100847 | 12/2016 |
| TW | 201236883 | 9/2012 |
| WO | 2012088253 | 6/2012 |
| WO | 2016141103 | 9/2016 |

OTHER PUBLICATIONS

"Office Action of China Counterpart Application," dated Sep. 3, 2019, p. 1-p. 9.

* cited by examiner

METHOD FOR MEASURING HEIGHT DIFFERENCE BETWEEN NOZZLE HEADS AND 3D PRINTING APPARATUS USING THE METHOD

CROSS-REFERENCE TO RELATED APPLICATION

This application claims the priority benefit of Taiwan application serial no. 106100349, filed on Jan. 5, 2017. The entirety of the above-mentioned patent application is hereby incorporated by reference herein and made a part of this specification.

BACKGROUND OF THE INVENTION

Field of the Invention

The present invention generally relates to a correction technology of a printing apparatus, in particular, to a method for measuring a height difference between nozzle heads and a three-dimensional (3D) printing apparatus using the method.

Description of Related Art

With the development of science and technology, the 3D printing technology has become one of the principally developed technologies. The 3D printing technology is also referred to as the Additive Manufacturing (AM) technology, is one of the rapid prototyping technologies, and may construct a 3D material object in a layer-by-layer printing manner using a bondable material, such as powered metal or plastic, on the basis of a digital prototyping diagram file.

In the prior art, a color of a finished product of the 3D printing is mainly a color of a bondable material, and separate nozzle heads (for example: an extrusion nozzle head) need to be used for bondable materials of different colors. In a case in which there is no room for mounting a plurality of 3D print head, a 3D printing apparatus usually can only print one color or a limited number of colors. To implement colorful 3D printing without increasing a volume of a 3D printing apparatus and costs and to prevent a color of a printed material object from being limited to a color of a material, manufacturers all hope to develop a novel coloring technology for 3D printing and resolve problems derived from the coloring technology.

SUMMARY OF THE INVENTION

The present invention provides a method for measuring a height difference between nozzle heads and a 3D printing apparatus using the method, in which a height difference between a 3D print head and an inkjet print head in the 3D printing apparatus can be measured, so as to enable both of the 3D print head and inkjet print head to perform product printing and product coloring respectively at proper heights.

A 3D printing apparatus of an embodiment of the present disclosure includes a printing module, a contact sensor, a displacement measurer, and a controller. The printing module includes a 3D print head and a color head. The displacement measurer is configured to obtain a vertical movement distance of the printing module or the contact sensor. The controller is coupled to the displacement measurer and contact sensor, where the contact sensor generates a contact signal when the 3D print head or the color head gets in contact with the contact sensor. The controller enables the 3D print head to get in contact with the contact sensor vertically to generate the contact signal, so as to obtain a first height value according to the vertical movement distance of the printing module or the contact sensor and the contact signal and enables the color head to get in contact with the contact sensor vertically to generate the contact signal, so as to obtain a second height value according to the vertical movement distance of the printing module or the contact sensor and the contact signal. In addition, the controller obtains a height difference between the 3D print head and the color head according to the first height value and the second height value.

From another point of view, a method for measuring a height difference between nozzle heads of an embodiment of the present disclosure is applicable to a 3D printing apparatus. The 3D printing apparatus includes a printing module and a contact sensor, and the printing module includes a 3D print head and a color head. The correction method includes the following steps: enabling the 3D print head to get in contact with the contact sensor vertically to enable the contact sensor to generate the contact signal, so as to obtain a first height value according to a vertical movement distance of the printing module or the contact sensor and the contact signal; enabling the color head to get in contact with the contact sensor vertically to enable the contact sensor to generate the contact signal, so as to obtain a second height value according to the vertical movement distance of the printing module or the contact sensor and the contact signal; obtaining a height difference between the 3D print head and the color head according to the first height value and the second height value.

On the basis of the foregoing, the present invention provides a method for measuring a height difference between nozzle heads and a 3D printing apparatus using the method, in which a height difference between a 3D print head and a color head in the 3D printing apparatus can be measured. The 3D printing apparatus can adjust the 3D print head and the color head separately according to the measured height difference, so as to improve accuracy of horizontal correction of the two types of nozzle heads. In this way, even if both of the 3D print head and the color head are disposed on a same rail, and there is a dimensional error between finished products of nozzle heads of a same type, optimal operating distances can be simultaneously maintained between the two types of nozzle heads and a 3D object according to the method of the present invention, so as to further improve quality of a finished product of the 3D object. Hence, the present invention can enable both of the 3D print head and color head in the 3D printing apparatus to perform product printing and product coloring respectively at proper heights.

In order to make the foregoing features and advantages of the present invention comprehensible, embodiments accompanied with drawings are described in detail below.

DESCRIPTION OF THE EMBODIMENTS

To achieve colorful 3D printing, a 3D printing apparatus may be equipped with two types of independent nozzle heads, where one type of nozzle head is a 3D print head (for example, an extrusion nozzle head), which involves an AM technology of using, for example, Selective Laser Sintering (SLS) and Selective Laser Melting (SLM) technologies to heat powder to a sintering temperature or a melting point to sinter or melt the powder into a layer of thin film with a specific thickness, so as to construct a 3D object. The other type of nozzle head is a color head for coloring a printed object, for example, an inkjet print head. The inkjet print head is configured to spray ink onto and perform coloring on each layer of the printed object constructed by the 3D print head. The color head according to embodiments of the present invention may perform coloring on the printed object in various manners and is not limited to an inkjet print head.

To mount the two types of nozzle heads, a common method is respectively disposing dedicated rails in the 3D printing apparatus for the two types of nozzle heads. Disposing two types of dedicated nozzle head rails needs high costs, easily results in a relatively large volume of the 3D printing apparatus, and occupies relatively large room. Although the types of nozzle heads may also be disposed in a same rail, there may be a dimensional error between finished products of nozzle heads of a same type. When horizontal correction is performed on a rail equipped with multiple nozzle heads, the foregoing dimensional error would causes a result of the correction to be inaccurate. In view of the above, if the two types of nozzle heads are disposed on a same rail, difficulty in horizontal correction is increased, which further causes quality of a finished 3D product to degrade. Therefore, how to maintain accuracy of horizontal correction in a case that the two types of nozzle heads share a same rail is one of the objectives of the present invention.

In order to enable a printing apparatus to maintain quality of a finished product of a 3D object in a case in which both a 3D print head and a color head are disposed on a same rail, the present invention proposes a method for measuring a height difference between nozzle heads and a 3D printing apparatus using the method. The present invention may derive a height difference between a 3D print head and a color head by measuring vertical distances between the two of the 3D print head and color head and a contact sensor. The 3D printing apparatus can adjust the 3D print head and the color head separately according to the measured height difference, so as to improve accuracy of horizontal correction of the two types of nozzle heads.

Figure 1:
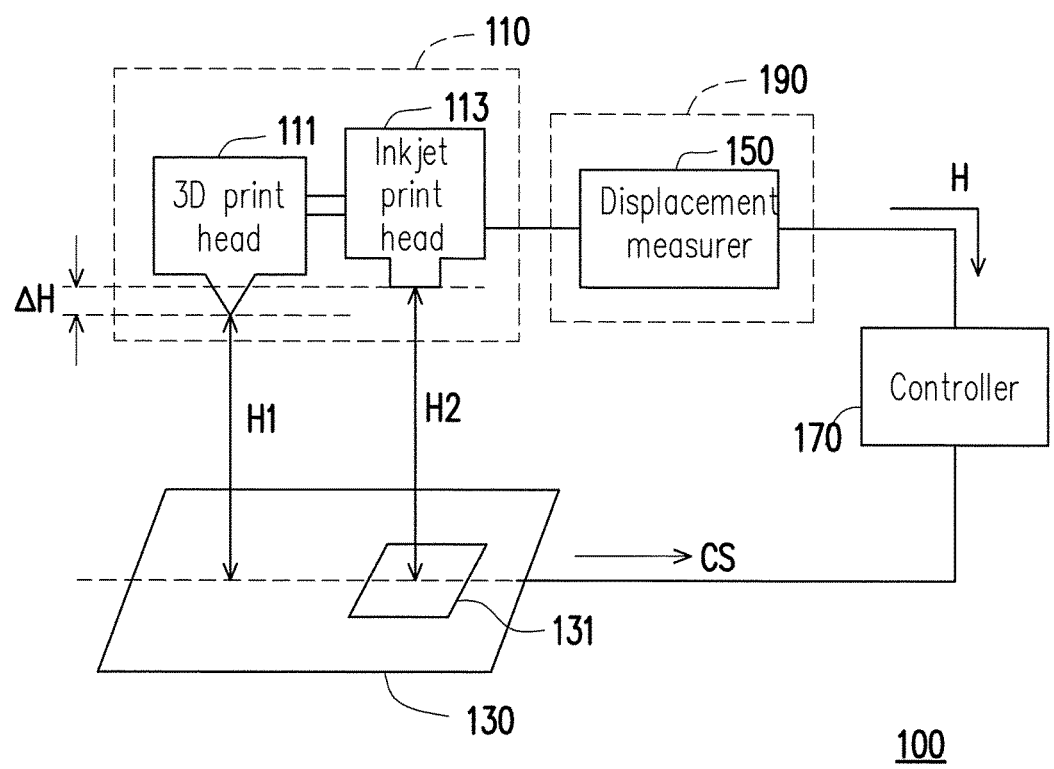
FIG. 1 is a schematic diagram illustrating a 3D printing apparatus according to an embodiment of the present invention.

FIG. 1 is a schematic diagram illustrating a 3D printing apparatus 100 according to an embodiment of the present invention. Referring to FIG. 1, the 3D printing apparatus 100 may include a printing module 110, a contact sensor 131, a displacement measurer 150, and a controller 170. The 3D printing apparatus 100 may, for example, be a 3D printer. The printing module 110 may include a 3D print head 111 and a color head (for example, an inkjet print head 113). The 3D print head 111 may, for example, use the SLS technology, the SLM technology, a Plaster-based 3D Printing (PP) technology, and a Fused Deposition Modeling (FDM) technology. The inkjet print head 113 may, for example, use a thermal bubble inkjet technology and a piezoelectric technology. The contact sensor 131 may, for example, be a limit switch or may, for example, be a component, such as a metal gasket or conductive plastic, capable of sending an electronic signal when being in contact with an object. The displacement measurer 150 may, for example, be a single chip microcomputer having a counting function, a microcontroller, and the like. The controller may, for example, be a central processing unit (CPU), a micro-processor, or an embedded controller that has a programmable general use or special use.

In this embodiment, the controller 170 may enable the 3D print head 111 or inkjet print head 113 to get in contact with the contact sensor 131 vertically, and the contact sensor 131 can generate a contact signal CS when the 3D print head 111 or inkjet print head 113 gets in contact with the contact sensor 131. The displacement measurer 150 can obtain a vertical movement distance of the printing module 110 or the contact sensor 131.

Specifically, FIG. 1 is used as an example, in which a 3D printing apparatus may further include a printing platform 130 and a motor 190, and the motor 190 may, for example, be a step motor. In the embodiment of FIG. 1, the contact sensor 131 may be disposed on the printing platform 130. The displacement measurer 150 may be disposed inside the motor 190, and the motor 190 may be coupled to the printing module 110 or the printing platform 130 and configured to move the printing module 110 or the printing platform 130. In FIG. 1, the motor 190 being coupled to the printing module 110 is used as an example. The controller 170 may control the printing module 110 by means of the motor 190, so as to enable the 3D print head 111 or inkjet print head 113 to move downward vertically to get in contact with the contact sensor 131 vertically. When the 3D print head 111 gets in contact with the contact sensor 131, the contact sensor 131 may generate a contact signal CS, and the contact signal CS is transmitted to the controller 170. In a process in which the printing module 110 moves vertically to the contact sensor 131, the displacement measurer 150 obtains a vertical movement distance H1 of the printing module 110 by measuring operation of the motor 190, and transmits information H corresponding to the vertical movement distance H1 to a control panel 170. When the control panel 170 receives the contact signal CS, the control panel 170 may obtain a first height value according to the information H corresponding to the vertical movement distance H1.

Similar to the foregoing steps, when the inkjet print head 113 gets in contact with the contact sensor 131, the contact sensor 131 may generate a contact signal CS, and the contact signal CS is transmitted to the controller 170. In a process in which the printing module 110 moves vertically to the contact sensor 131, the displacement measurer 150 obtains a vertical movement distance H2 of the printing module 110 by measuring operation of the motor 190, and transmits information H corresponding to the vertical movement distance H2 to a control panel 170. When the control panel 170 receives the contact signal CS, the control panel 170 may obtain a second height value according to the information H corresponding to the vertical movement distance H2.

In the foregoing embodiment, a step motor is used to move the printing module 110, so that the displacement measurer 150 can learn a movement distance of the 3D print head 111 or inkjet print head 113 in a manner of using a counter. In another embodiment, the displacement measurer 150 may also obtain a distance of the 3D print head 111 or inkjet print head 113 by using fixed point information provided by a processor. When this embodiment is applied, the displacement measurer 150 may be enabled to calculate a movement distance of the 3D print head 111 or inkjet print head 113 in various manners, which is not limited to the foregoing embodiment.

When the controller 170 obtains a first height value corresponding to a distance between the 3D print head 111 and the contact sensor 131 and a second height value corresponding to a distance between the inkjet print head 113 and the contact sensor 131, a console may obtain a height difference ΔH between the 3D print head 111 and the inkjet print head 113 by perform subtraction on a first height 1 and the second height value.

In another embodiment, the motor 190 may be coupled to the printing platform 130, control the printing platform 130, and thus, enable the contact sensor 131 to move upward vertically to get in contact with the 3D print head 111 or inkjet print head 113 vertically. In this embodiment, the displacement measurer 150 may obtain the vertical movement distance H1 of the printing platform 130 by measuring operation of the motor 190. Likewise, the displacement measurer 150 may obtain the vertical movement distance H2 of the printing platform 130 by measuring operation of the motor 190. Hence, the console may obtain a height difference ΔH between the 3D print head 111 and the inkjet print head 113 by performing subtraction on the first height 1 and the second height value. In addition to the foregoing steps, the rest steps of this embodiment are approximately the same as those of the foregoing embodiment, and the descriptions thereof are omitted herein.

In another embodiment, the displacement measurer 150 may also be individually disposed outside the motor 190. As long as the displacement measurer 150 is enabled to measure operation of the motor 190 and transmit the obtained vertical movement distance information H corresponding to the printing module 110 or printing platform 130 to the control panel 170, a user could adjust a disposition manner of the displacement measurer 150 at will according to use requirements, and the present invention is not limited thereto. In other words, one of the objectives of the embodiments of the present invention is to obtain the height difference ΔH between the 3D print head 111 and the inkjet print head 113, and application of this embodiment may be achieved by using the contact sensor 131 and displacement measurer 150 in many manners, which are not limited to manners in the embodiments of the present invention.

Figure 2A:
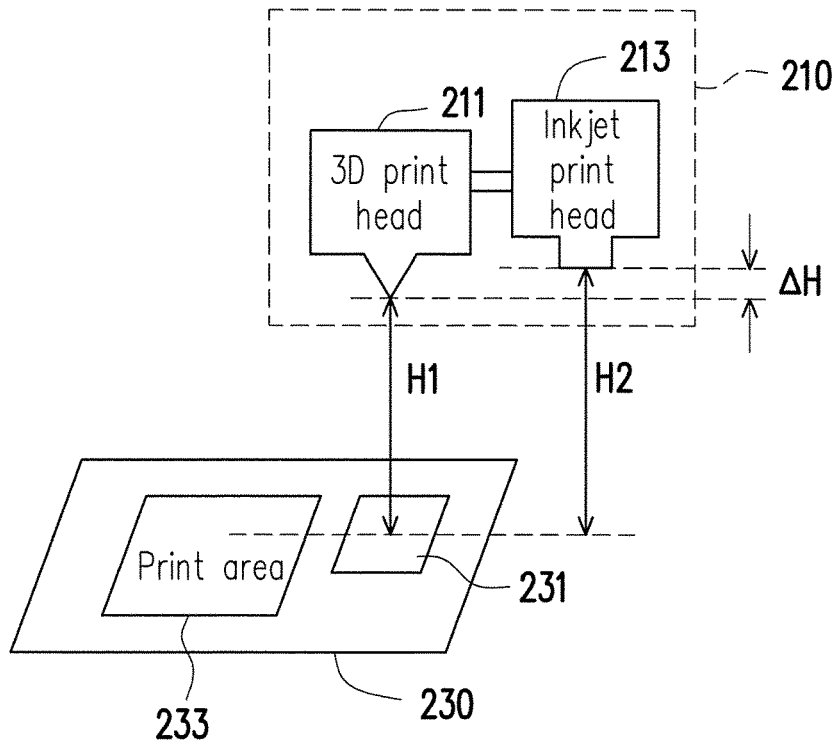
FIG. 2A and FIG. 2B are schematic diagrams illustrating vertical distances between both of a 3D print head and an inkjet print head and a contact sensor according to an embodiment of the present invention.
Figure 2B:
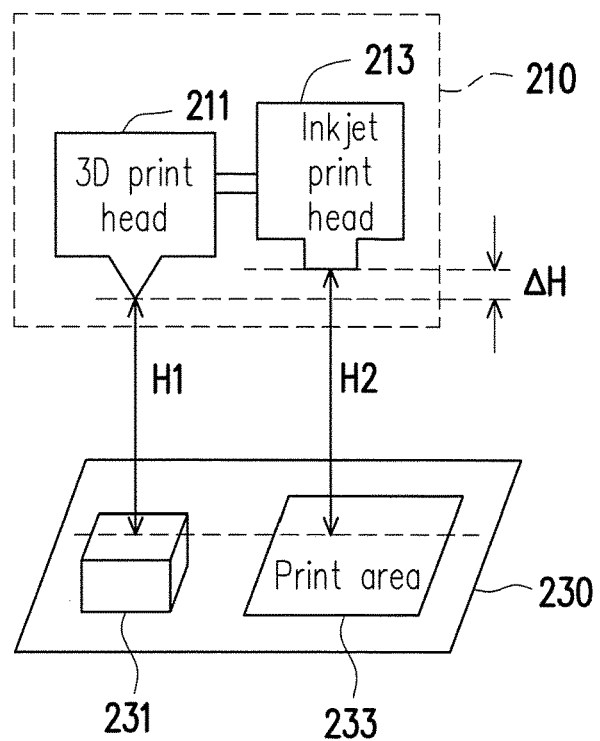

FIG. 2A and FIG. 2B are schematic diagrams illustrating vertical distances between both of a 3D print head and an inkjet print head and a contact sensor according to an embodiment of the present invention, where the apparatus in FIG. 2A, 2B includes a printing module 210, a printing platform 230, a 3D print head 211, an inkjet print head 213, and a contact sensor 231, operating manners and functions of the foregoing apparatus are all the same as those of the apparatus in the embodiment of FIG. 1, and the descriptions thereof are omitted herein. First refer to FIG. 2A. In the embodiment of FIG. 2A, the 3D print head 211 and the inkjet print head 213 in the printing module 210 are fixedly disposed relative to each other, and the 3D print head 211 is closer to the printing platform 230 than the inkjet print head 213.

In the embodiment of FIG. 2A, in order to measure a first height value corresponding to a distance between the 3D print head 211 and the contact sensor 231 and a second height value corresponding to a distance between the inkjet print head 213 and the contact sensor 231 to obtain a height difference ΔH between the 3D print head 211 and the inkjet print head 213, the printing module 210 or the printing platform 230 needs to perform vertical movement twice. The printing module 210 moving vertically is used as an example, a controller (not shown in FIG. 2A) may further align the inkjet print head 213 with the contact sensor 231, and after the two are aligned, the printing module 210 moves downward vertically to enable the inkjet print head 213 to get in contact with the contact sensor 231. Because the 3D print head 211 is closer to the printing platform 230 than the inkjet print head 213, in a process in which the printing module 210 moves downward vertically, the 3D print head 211 might first get in contact with the printing platform 230, and at this time, the printing module 210 is stuck and stops moving downward vertically, resulting in that the inkjet print head 213 cannot get in contact with the contact sensor 231. In order to resolve this problem, in the embodiment of FIG. 2A, the contact sensor 231 may be disposed on an edge of the printing platform 230. In view of FIG. 2A, if the contact sensor 231 is disposed on an edge of the printing platform 230, the 3D print head 211 can be prevented from touching the printing platform 230 in a process in which the inkjet print head 213 gets in contact with the contact sensor 231 (that is, descending to the dashed line), so that the contact proceeds smoothly.

In addition, the embodiment of FIG. 2B also provides another method for resolving the foregoing problem, referring to FIG. 2B. In the embodiment of FIG. 2B, a height difference between the contact sensor 231 and the printing platform 230 is greater than a height difference ΔH between the 3D print head 211 and the inkjet print head 213. Therefore, when the inkjet print head 213 gets in contact with the contact sensor 231, the 3D print head 211 does not touch printing platform 230, so that the contact proceeds smoothly.

In both of the embodiments of FIG. 2A and FIG. 2B, the contact sensor 231 is disposed on the printing platform 230. However, the contact sensor 231 may also be disposed outside the printing platform 230. Along as the 3D print head 211 and inkjet print head 213 can get in contact with the contact sensor 231 successfully, a user may dispose the contact sensor 231 in an area outside a print area 233 of the printing platform 230 at will according to use requirements, and the present invention is not limited thereto.

The present invention does not limit a sequence in which the 3D printing apparatus obtains the first height value and the second height value. FIG. 2B is used as an example, and the controller may first enable the inkjet print head 213 to get in contact with the contact sensor 231, so as to obtain a second height value corresponding to a distance between the inkjet print head 213 and the contact sensor 231. Subsequently, the controller recovers original relative positions of the inkjet print head 213 and contact sensor 231 before the vertical movement by moving the printing module 210 or printing platform, that is, returning the inkjet print head 213. After the returning of the inkjet print head 213 is completed, the controller may further enable the 3D print head 211 to get in contact with the contact sensor 231, so as to obtain a first height value corresponding to a distance between the 3D print head 211 and the contact sensor 231.

The controller may also choose not to return the 3D print head 211 or inkjet print head 213. FIG. 2B is used as an example, in another embodiment, the controller may first enable the inkjet print head 213 to get in contact with the contact sensor 231, so as to obtain a second height value corresponding to a distance between the inkjet print head 213 and the contact sensor 231. After the second height value is obtained, the controller may control the printing module 210 to make it return to a reset height. When the printing module 210 returns to the preset height, the console horizontally moves the movement printing module 210 to align the 3D print head 211 with the contact sensor 231, so as to subsequently execute a relevant procedure of obtaining a first height value corresponding to a distance between the 3D print head 211 and the contact sensor 231. In the foregoing process, because horizontal correction of the nozzle heads is not finished, the inkjet print head 213 is lifted up to a preset height, so as to prevent the inkjet print head 213 from being stuck by the contact sensor 231 or any other possible mechanism during horizontal movement. The console may also choose to not to ascend to a preset height and directly perform horizontal movement of the inkjet print head 213 or 3D print head 211. For example, the console may first enable the inkjet print head 213 to get in contact with the contact sensor 231, so as to obtain a second height value corresponding to a distance between the inkjet print head 213 and the contact sensor 231. After the second height value is obtained, because the inkjet print head 213 is closer to the printing platform 230 than the 3D print head 211, the console may directly horizontally move the movement printing module 211 to align with the contact sensor 231, so as to subsequently execute a relevant procedure of obtaining a first height value corresponding to a distance between the 3D print head 211 and the contact sensor 231. In this embodiment, the console can obtain a first height value and a second height 2 without returning the 3D print head 211 or inkjet print head 213, so that a horizontal correction time of the 3D printing apparatus can be shortened.

Figure 3A:
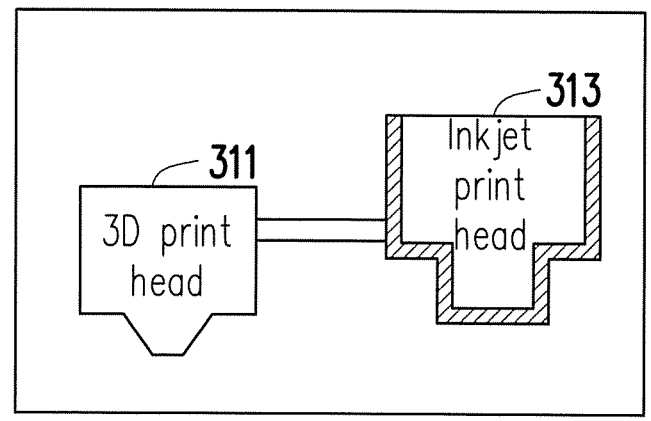
FIG. 3A, FIG. 3B, and FIG. 3C are schematic diagrams illustrating contact sensor types according to an embodiment of the present invention.
Figure 3A:
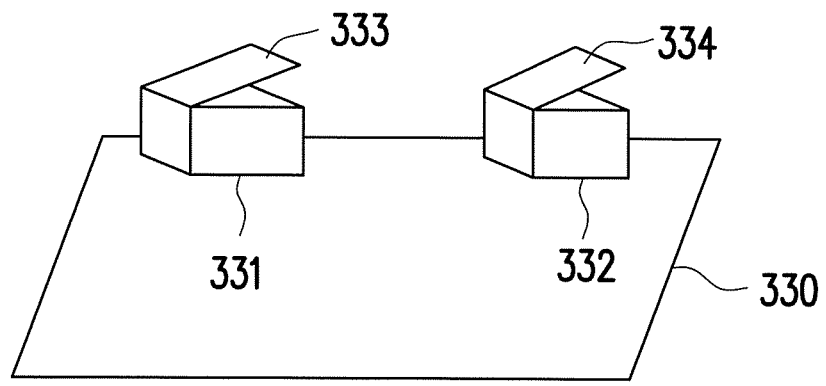
Figure 3B:
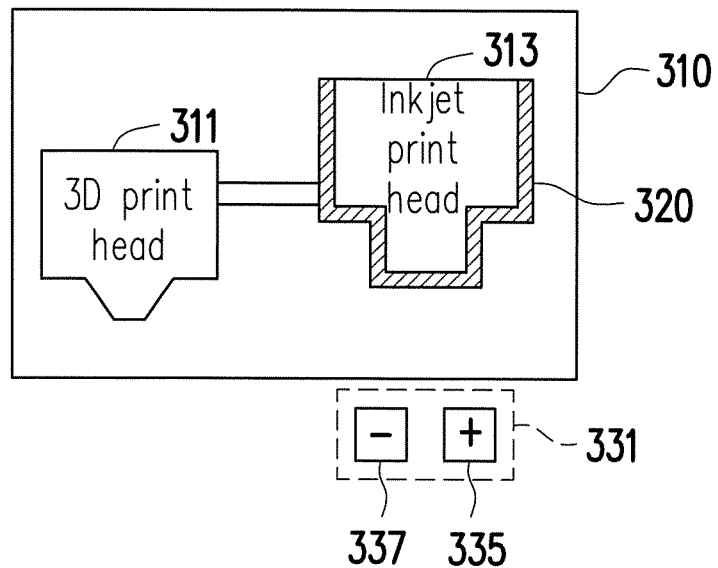
Figure 3C:
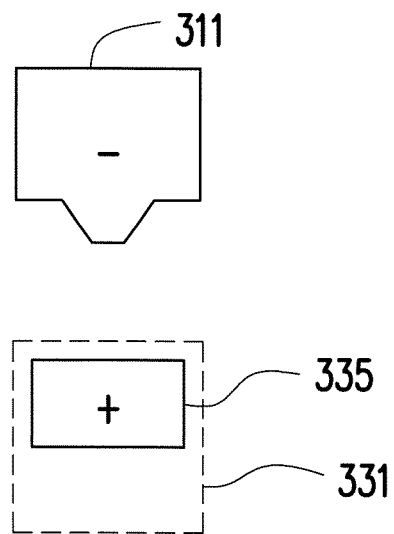

FIG. 3A, FIG. 3B, and FIG. 3C are schematic diagrams illustrating contact sensor types according to an embodiment of the present invention. Referring to FIG. 3A, a printing module 310, a 3D print head 311, an inkjet print head 313, and a contact sensor 331 of FIG. 3A respectively correspond to the printing module 110, the 3D print head 111, the inkjet print head 113, and the contact sensor 131 of FIG. 1A. In the embodiment of FIG. 3A, the contact sensor 331 may be a limit switch 331. When the 3D print head 311 or inkjet print head 313 gets in contact with the limit switch 331, the 3D print head 311 or inkjet print head 313 presses down an elastic object 333 on the limit switch 331, according to which the limit switch 331 may transmit a contact signal CS to a control panel, so as to enable the control panel to obtain a vertical movement distance of the printing module 310 or limit switch 331.

FIG. 3B and FIG. 3C proposes an embodiment of another type of contact sensor. In the embodiment of FIG. 3B and FIG. 3C, the contact sensor 331 may be one or a combination of a conductive contact 335 and a conductive contact 337. First refer to FIG. 3B. In the embodiment of FIG. 3B, a conductive object 320 may be disposed on an outer side of the 3D print head 311 and the inkjet print head 313, and the conductive object 320 may be a metal thin film or a metal housing. When the 3D print head 311 or inkjet print head 313 gets in contact with the limit switch 331, the conductive object 320 disposed on the outer side of the 3D print head 311 or inkjet print head 313 may connect the conductive contact 335 and the conductive contact 337, according to which the limit switch 331 may transmit a contact signal CS to a control panel, so as to enable the control panel to obtain a vertical movement distance of the printing module 310 or limit switch 311. In addition, generally, a body of the 3D print head 311 is made of a metal material. In this case, the outer side of the 3D print head 311 may also be not provided with the conductive object 320 and connect the conductive contact 335 and the conductive contact 337 by means of a conductive function of the 3D print head 311.

Subsequently, please refer to FIG. 3C. The embodiment of FIG. 3C assumes a situation that the 3D print head 311 or inkjet print head 313 per se is charged. For example, in the case in which the 3D print head 311 per se is charged with a negative voltage, the contact sensor 331 may be constituted by only one conductive contact 335 charged with a positive voltage. When the 3D print head 311 gets in contact with the limit switch 331, the 3D print head 311 is electrically connected to the conductive contact 335, according to which the limit switch 331 may transmit a contact signal CS to a control panel, so as to enable the control panel to obtain a vertical movement distance of the printing module 310 or limit switch 311.

It is worth notating that the present invention is not limited to using a single contact sensor. FIG. 3A is used as an example, and 3D printing apparatus may also, for example, be equipped with two contact sensors on the printing platform 330. The two contact sensors need to be maintained at the same horizontal height by means of horizontal correction. In this case, when the controller vertically moves the movement printing module 310 or printing platform 330, the 3D print head 311 and the inkjet print head 313 may respectively get in contact with a contact sensor 331 and a contact sensor 332 vertically. In this embodiment, because the inkjet print head 313 is closer to the printing platform 330 than the 3D print head 311, the 3D print head 311 first gets in contact with the contact sensor 331, according to which the contact sensor 331 may transmit a contact signal CS1 to the control panel, so as to enable the control panel to obtain a current vertical movement distance H1 of the printing module 310 or contact sensor 331 and thus, obtain a first height value corresponding to a distance between the 3D print head 311 and the contact sensor 331. After the 3D print head 311 gets in contact with the contact sensor 331, and the inkjet print head 313 gets in contact with the contact sensor 332, according to which the contact sensor 332 transmits a contact signal CS2 to the control panel, so as to enable the control panel to obtain a current vertical movement distance H2 of the printing module 310 or contact sensor 332 and thus, obtain a second height value corresponding to a distance between the inkjet print head 313 and the contact sensor 332, thereby obtaining a height difference ΔH between the 3D print head 311 and the inkjet print head 313.

Figure 4:
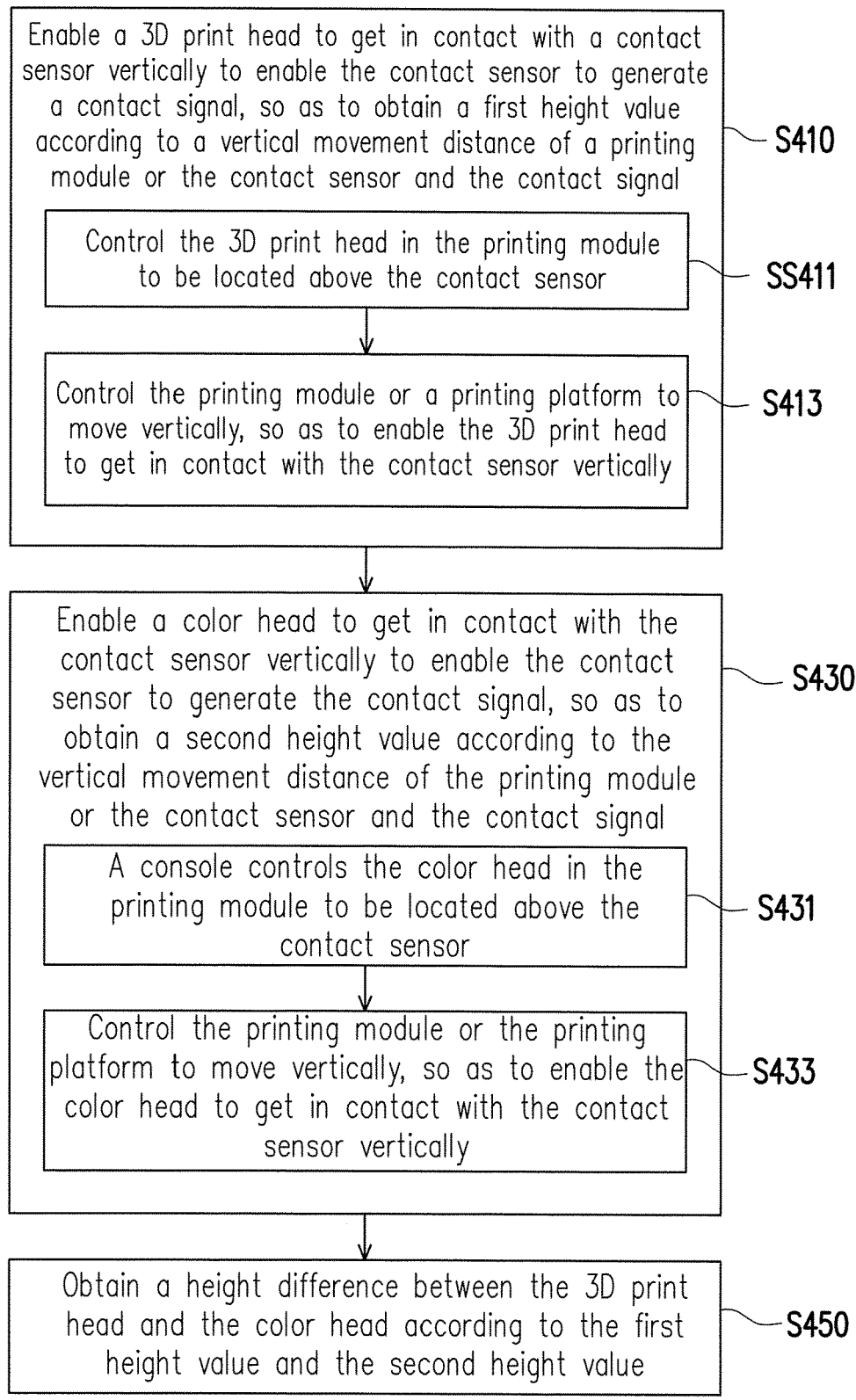
FIG. 4 is a flowchart illustrating a method for measuring a height difference between nozzle heads according to an embodiment of the present invention.

FIG. 4 is a flowchart illustrating a method for measuring a height difference between nozzle heads according to an embodiment of the present invention. The method for measuring a height difference between nozzle heads is applicable to the printing apparatus 100 in the embodiment of FIG. 1. The correction method includes the following steps. Step 410: A controller 170 may enable a 3D print head 111 to get in contact with a contact sensor 131 vertically to enable the contact sensor 131 to generate a contact signal CS, and the controller 170 obtains a first height value according to a vertical movement distance H1 of a printing module 110 or the contact sensor 131 and the contact signal CS. Subsequently, step S430: The controller 170 may enable a color head (for example, an inkjet print head 113) to get in contact with the contact sensor 131 vertically to enable the contact sensor 131 to generate a contact signal CS, and the controller 170 obtains a second height value according to a vertical movement distance H2 of the printing module 110 or the contact sensor 131 and the contact signal CS. Step S450: The controller 170 may obtain a height difference ΔH between the 3D print head 111 and the color head according to the first height value and the second height value. It should be noted that a sequence of steps S410 and S430 can be adjusted by a user according to requirements, and the present invention is not limited thereto.

Specifically, step S410 further includes the following steps before the step that a console 170 enables a 3D print head 111 to get in contact with a contact sensor 131 vertically. Step S411: A control panel 170 controls the 3D print head 111 in the printing module 110 to be located above the contact sensor 131. Subsequently, step S413: The control panel 170 controls the printing module 110 or a printing platform 130 to vertically move, so as to enable the 3D print head 111 to get in contact with the contact sensor 131 vertically. On the other than, step S430 further includes the following steps before the step that the console 170 enables a color head to get in contact with the contact sensor 131 vertically. Step S431: The control panel 170 controls the color head in the printing module 110 to be located above the contact sensor 131. Subsequently, step S433: The control panel 170 controls the printing module 110 or a printing platform 130 to vertically move, so as to enable the color head to get in contact with the contact sensor 131 vertically.

In conclusion, the present invention provides a method for measuring a height difference between nozzle heads and a 3D printing apparatus using the method, in which a height difference between a 3D print head and a color head in the 3D printing apparatus can be measured. The 3D printing apparatus can adjust the 3D print head and the color head separately according to the measured height difference, so as to improve accuracy of horizontal correction of the two types of nozzle heads. In this way, even if both of the 3D print head and the color head are disposed on a same rail, and there is a dimensional error between finished products of nozzle heads of a same type, optimal operating distances can be simultaneously maintained between the two types of nozzle heads and a 3D object according to the present invention, so as to further improve quality of a finished product of the 3D object.

Although embodiments of the present invention are disclosed as above, they are not intended to limit the present invention. Any person of ordinary skill in the art may make some variations or modifications without departing from the spirit and scope of the present invention. Therefore, the protection scope of the present invention shall be subject to the protection scope of the appended claims.

What is claimed is:

1. A three-dimensional (3D) printing apparatus, comprising:
   a printing module, comprising a 3D print head and a color head disposed on a same rail;
   a contact sensor;
   a printing platform, wherein the contact sensor is disposed on the printing platform;
   a motor, coupled to the printing module or the printing platform and configured to move the printing module or the printing platform;
   a displacement measurer, configured to obtain a vertical movement distance of the printing module or the contact sensor, wherein the displacement measurer obtains the vertical movement distance of the printing module or the contact sensor by measuring operation of the motor; and
   a controller, coupled to the displacement measurer and contact sensor, wherein the contact sensor generates a contact signal when the 3D print head or the color head gets in contact with the contact sensor, wherein the controller drives the 3D print head to get in contact with the contact sensor vertically to generate the contact signal, so as to obtain a first height value according to the vertical movement distance of the printing module or the contact sensor and the contact signal, and drives the color head to get in contact with the contact sensor vertically to generate the contact signal, so as to obtain a second height value according to the vertical movement distance of the printing module or the contact sensor and the contact signal, and
   the controller obtains a height difference between the 3D print head and the color head according to the first height value and the second height value and performs horizontal correction according to the height difference between the 3D print head and the color head.

2. The 3D printing apparatus according to claim 1, wherein the 3D print head and the color head in the printing module are fixedly disposed relative to each other, and the 3D print head is closer to the printing platform than the color head.

3. The 3D printing apparatus according to claim 1, wherein the contact sensor is a limit switch.

4. The 3D printing apparatus according to claim 1, wherein a conductive object is disposed on an outer side of the 3D print head or the color head, and
   the contact sensor comprises a conductive contact, wherein when the 3D print head or the color head gets in contact with the conductive contact, the contact signal is generated.

5. The 3D printing apparatus according to claim 1, wherein the contact sensor is disposed on an area outside a print area of the printing platform.

6. A method for measuring a height difference between nozzle heads, applicable to a 3D printing apparatus, wherein the 3D printing apparatus comprises a printing module, a contact sensor, a printing platform, a motor, and a displacement measurer, the printing module comprises a 3D print head and a color head disposed on a same rail, the contact sensor is disposed on the printing platform, the motor is coupled to the printing module or the printing platform and configured to move the printing module or the printing platform, the displacement measurer obtains the vertical movement distance of the printing module or the contact sensor by measuring operation of the motor, and the method for measuring the height difference comprises:
   driving the 3D print head to get in contact with the contact sensor vertically to drive the contact sensor to generate the contact signal, so as to obtain a first height value according to a vertical movement distance of the printing module or the contact sensor and the contact signal;
   driving the color head to get in contact with the contact sensor vertically to drive the contact sensor to generate the contact signal, so as to obtain a second height value according to the vertical movement distance of the printing module or the contact sensor and the contact signal;
   obtaining a height difference between the 3D print head and the color head according to the first height value and the second height value; and
   performing horizontal correction according to the height difference between the 3D print head and the color head.

7. The method for measuring a height difference according to claim 6, further comprising:
   after obtaining the first height value or the second height value, controlling the printing module to return to a preset height.

8. The method for measuring a height difference according to claim 6, wherein the 3D print head and the color head in the printing module are fixedly disposed relative to each other, and the 3D print head is closer to the printing platform than the color head.

9. The method for measuring a height difference according to claim 6, before the step of driving the 3D print head to get in contact with the contact sensor vertically, comprising the following steps:
- controlling the 3D print head in the printing module to be located above the contact sensor; and
- controlling the printing module or the printing platform to move vertically, so as to drive the 3D print head to get in contact with the contact sensor vertically; and
- before the step of driving the color head to get in contact with the contact sensor vertically, comprising the following steps:
- controlling the color head in the printing module to be located above the contact sensor; and
- controlling the printing module or the printing platform to move vertically, so as to drive the color head to get in contact with the contact sensor vertically.

* * * * *